United States Patent
Zhang et al.

(10) Patent No.: US 12,361,972 B2
(45) Date of Patent: Jul. 15, 2025

(54) AUDIO/VIDEO OUTRODUCTION BY REUSING CONTENT FROM INTRODUCTION AND OTHER PARTS

(71) Applicants: Steve Haoxiang Zhang, San Diego, CA (US); Danlu Zhang, San Diego, CA (US)

(72) Inventors: Steve Haoxiang Zhang, San Diego, CA (US); Danlu Zhang, San Diego, CA (US)

( * ) Notice: Subject to any disclaimer, the term of this patent is extended or adjusted under 35 U.S.C. 154(b) by 0 days.

(21) Appl. No.: 17/670,505

(22) Filed: Feb. 14, 2022

(65) Prior Publication Data

US 2022/0262407 A1 Aug. 18, 2022

Related U.S. Application Data

(60) Provisional application No. 63/149,601, filed on Feb. 15, 2021.

(51) Int. Cl.
| | |
|---|---|
| *G06F 3/00* | (2006.01) |
| *G06F 3/0482* | (2013.01) |
| *G06F 3/0484* | (2022.01) |
| *G11B 27/00* | (2006.01) |
| *G11B 27/036* | (2006.01) |

(52) U.S. Cl.
CPC .......... *G11B 27/036* (2013.01); *G06F 3/0482* (2013.01); *G06F 3/0484* (2013.01); *G11B 27/005* (2013.01)

(58) Field of Classification Search
CPC ... G11B 27/036; G11B 27/005; G06F 3/0482; G06F 3/0484
See application file for complete search history.

(56) References Cited

U.S. PATENT DOCUMENTS

| | | | |
|---|---|---|---|
| 10,515,665 B1 * | 12/2019 | Stavchansky | G11B 27/002 |
| 10,540,699 B1 * | 1/2020 | Prabhu | H04N 5/907 |
| 2010/0085363 A1 * | 4/2010 | Smith | H04N 5/262 |
| | | | 345/473 |
| 2010/0220974 A1 * | 9/2010 | Yamashita | H04N 5/783 |
| | | | 386/344 |
| 2021/0225406 A1 * | 7/2021 | Han | H04N 21/44016 |

* cited by examiner

*Primary Examiner* — Brett A Feeney
*Assistant Examiner* — Andrew Chung (57) ABSTRACT

A multimedia production method includes: reusing the content in the introduction before the main content or other part in the multimedia file for an outroduction after the main content and playing the audio and/or video content in the reverse direction. A producer can make the multimedia file by attaching such an outroduction. A multimedia editing program can provide a user interface with menu options for such a production technique. The media production program could be associated with the multimedia sharing and distributing network. Such a production method could be applied to multiple multimedia files in the same media sharing and distributing network by the same producer. The same content can be reused in a cluster of media files.

12 Claims, 8 Drawing Sheets

| Video | Video | Video |
|---|---|---|
| Introduction | Main Part | Outroduction |
| Audio | Audio | Audio |

Major parts of a video file.

FIG. 1 A simplified view of a video editing program user interface.

| Video | Video | Video |
|---|---|---|
| Introduction | Main Part | Outroduction |
| Audio | Audio | Audio |

FIG. 2 Major parts of a video file.

| Video | | Video |
|---|---|---|
| Introduction | Main part | Outroduction |
| Audio | | Audio |

FIG. 3 Reusing audio and video in the introduction as outroduction.

FIG. 4 Reused audio and video in the outroduction played at normal speed.

FIG. 5 Reused audio and video in the outroduction played in reverse at normal speed.

FIG. 6 Reused audio in the outroduction played in reverse at normal speed; reused video in the outroduction played at normal speed.

FIG. 7 Reused audio in the outroduction played at normal speed; reused video in the outroduction played in reverse at normal speed.

FIG. 8 Some of the multiple clips in the introduction are resued in the outroduction.

FIG. 9 New content is added between the reused clips in the outroduction.

Fig. 10 An example drop-down menu.

Fig. 11 An example of a dynamic drop-down menu after the user has specified an introduction in addition to the main part of a video file/project.

Fig. 12 An example of a dynamic right-click menu after the user has specified an introduction in addition to the main part of a video file/project.

Fig. 13 An example of a pop-up prompt after the user has specified an introduction in addition to the main part of a video file/project.

Fig. 14 An example process for handling the dynamic menu, right-click menu and user prompt.

AUDIO/VIDEO OUTRODUCTION BY REUSING CONTENT FROM INTRODUCTION AND OTHER PARTS

FIELD OF THE INVENTION

This invention relates to methods and user interfaces specifically for the purpose of editing and manipulating multimedia files.

BACKGROUND OF THE INVENTION

Digital recording and editing of sound and video has become mainstream for the preparation and production of audio and video publications in a variety of media industries. Editing functions, such as inserting, deleting, moving or copying, are easily accomplished by manipulating digital audio and video data. A visual representation of an audio waveform may be used in combination with audible playback of the waveform to identify desired audio segments. Conventionally, desired sections of digital audio tracks are marked, highlighted, or selected. The selection, in a desktop or laptop computer system, or an application on a tablet or smart phone, is controlled by means of a keyboard, a mouse and/or a touch screen. Likewise, in video editing systems, visual representation of the visual media along with the associated audio data, is represented on the screen along a timeline. Desired sections of audio and video are marked, highlighted or selected. This selection, in a desktop or laptop computer system, or an application on a tablet or smart phone, is controlled by means of a keyboard, a mouse and/or a touch screen. In both cases, the user creates a 'mark in' along the timeline, and then a 'mark out' along the timeline, in order to identify the section of audio, video, or both mediums, the user wishes to manipulate. These features enable users to generate and create media content based on captured content by cameras and audio/video recorders.

In recent years, with the spread of broadband media and the speed of communication, the Internet has emerged as a new medium for sharing multimedia content. User generated multimedia files including audio files or videos are increasingly popular. Many users post their videos on YouTube and other hosting platforms. Some users organize their production and sharing by establishing a channel such that multiple audio files and/or videos can be lumped together. They can also build fan bases and accumulate brand value. To facilitate such production, the media sharing website often provides audio and video editing programs for users to modify their digital recording.

Another media production method is through GPU rendering in which contents are generated through 2D or 3D rendering instead of editing camera or audio/video recordings.

With all these production methods, one common practice in finishing an audio and/or video file is to add an introduction before the main content. The same introduction may be used for multiple audio and video files or productions. A further practice is to have an outroduction after the main content and at the end of the audio or video files. While the producer of the media file often uses the introduction to capture viewers attention through sensational scenes or sounds, the producer can use the outroduction for acknowledging contributors to the creation and production. Some examples of outroduction may be the list of names involved in the audio or video production, acknowledgment of contributing sources, etc. Other ways of ending the audio or video with an outroduction may be adopted. The outroduction may be useful beyond laying out the acknowledgement. It could provide another opportunity for the producer to reinforce some of the key points of the media presentation including those in the introduction.

The outroduction may reuse the same audio, image or video content to save production cost and put emphasis on certain content. In particular, the audio and video which are reused from the introduction can be played in reverse in outroduction. The choice of content and the manner of reusing can enhance the appeal of outroduction and will be discussed in this application.

In this application, the user of a multimedia editing program may be the same as the producer of the multimedia content.

SUMMARY OF THE INVENTION

Each of the introduction, main and outroduction part may comprise one or multiple audio or video clips.

Hereby a multimedia editing method refers to a computer (including tablets and smart phones) controlled programs which provides menu options and user interfaces for a multimedia producer to create, modify and/or publish an audio/video file.

Hereby a multimedia production method refers to a producer's operations, optionally through the computer provided menu options and user interfaces to create, modify and/or publish an audio/video file. The producer may produce the media file without using the computer provided program.

The computer here refers a broad range of computing device, including but not limited to, personal computers (PCs), laptops, server machines, or tablets, smart phones, etc.

The introduction part may contain audio, image or video content which may be part of the main content and reappear in the main part. For example, the introduction of a movie may be the prelude to the main story, or a beginning part of the story. The introduction could be also filled with audio and video content which is separate from the main content. As a further instance, the introduction may be a segment of audio or video content which is common to many postings from the same author, or in the same channel.

2D or 3D rendered content by GPU can be treated in a similar way as a video clip or file. The GPU rendered clip or file may or may not contain an audio part.

A typical video editing program has internal mechanisms, in addition to the meta information in the original file, to keep the audio and video part synchronized.

A typical video editing program provides a user interface which displays thumbnails of snapshots of various parts of the video. The corresponding audio may be illustrated by a display of the sound wave magnitude which is in sync with the video. The producer (user) can click the beginning and end point of a segment of a video, which may correspond to a clip, part of a clip, multiple clips, or a combination thereof.

The producer may separate the file into multiple parts including an introduction, main and outroduction. In case the produce uses a computer controlled multimedia editing program, options may be presented to the producer to have such parts.

DETAILED DESCRIPTION OF EMBODIMENTS OF THE INVENTION

Figure 1:
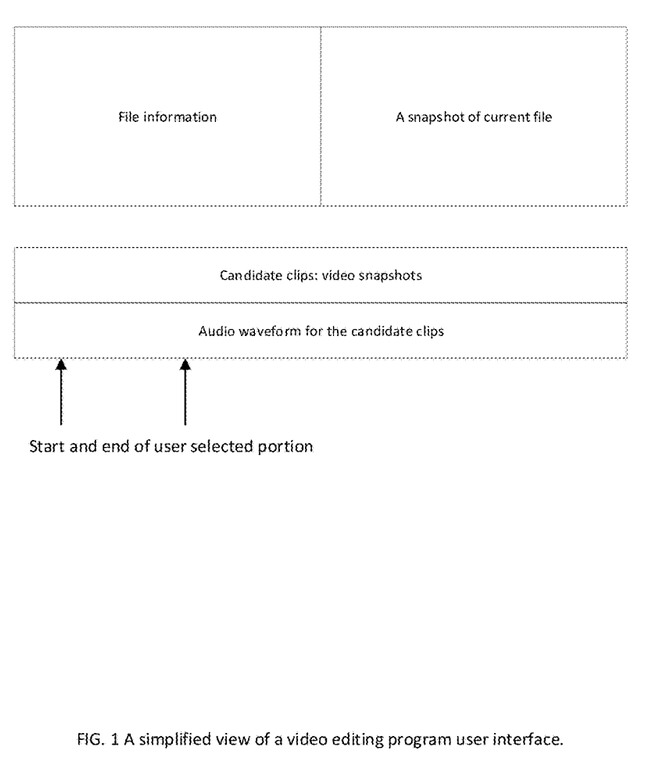
FIG. 1 is a simplified view of a video editing program user interface.

FIG. 1 is a simplified view of a video editing program user interface. The interface provides a large window showing a snapshot of the current video scene. The snapshot may be analyzed for many aspects including size, contrast, hue, etc. The interface also provides an overview of candidate clips with video snapshots shown as small thumbnails and audio shown as a waveform of amplitude. The interface also provides editing tools. For example, the user could select a portion from a candidate clip to be included in the video file. The start and end of such selection can be marked by the user and are shown as arrows in FIG. 1. The selected portion can be manipulated with audio and video edited by separate methods. In particular, the user can specify the direction and speed of the selected video clips. These may be part of the default drop-down menu.

Figure 2:
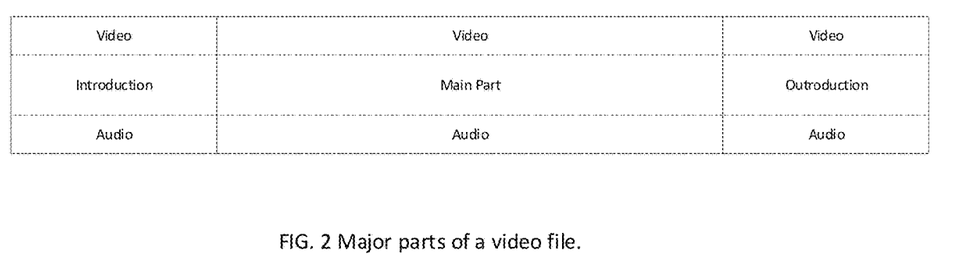
FIG. 2 is a simplified view of a video file with its major parts.

FIG. 2 is a simplified view of a video file with its major parts. The user could add an introduction before the main part and an outroduction after the main part. The video editing program user interface in FIG. 1 can also provide menu options or on-screen pop-ups to prompt the user to specify a list of suggested parts including introduction, main part and outroduction. One example implementation of a pop-up prompt is inquiring the user whether an outroduction part will be included, as discussed in the mechanism of FIG. 13.

Figure 3:
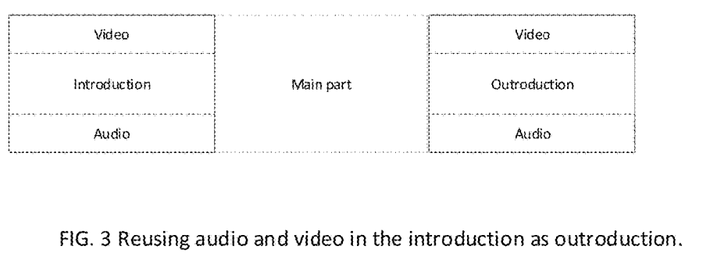
FIG. 3 is an embodiment of a video file with audio and video in the introduction reused for the outroduction.

FIG. 3 is an embodiment of a video file with audio and video in the introduction reused for the outroduction. The user may decide to use the same audio, image or video content to save production cost and put emphasis on certain content. The video editing program user interface in FIG. 1 can also provide menu options or on-screen pop-ups to prompt the user to reuse a part of or the entire content in the introduction for the outroduction. One example implementation of a pop-up prompt is reminding the user that a part of the introduction can be reused for outroduction. The introduction part in the overview portion could be highlighted to remind the user about this option.

To add fun to the viewing experience, the audio and video which are reused from the introduction can be played in reverse in outroduction. There may be several options which are shown in FIG. 4 to FIG. 7.

Figure 4:
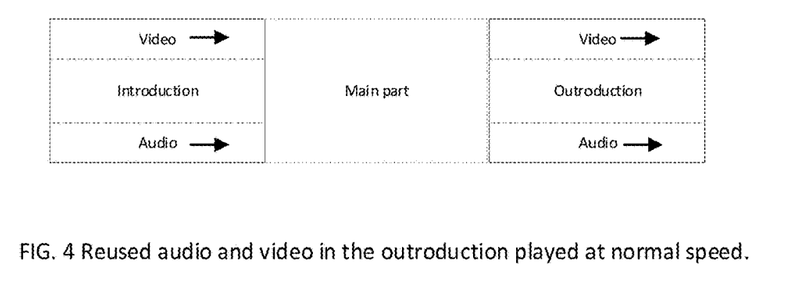
FIG. 4 is an embodiment of a video file with audio and video in the introduction reused for the outroduction wherein both the reused audio and video are played at normal speed.

FIG. 4 is an embodiment of a video file with audio and video in the introduction reused for the outroduction wherein both the reused audio and video are played at normal speed. This may be the most straightforward way of reusing the content from the introduction. One of the benefits is low cost to production and emphasis on the chosen content. The viewers may remember this part more clearly.

Figure 5:
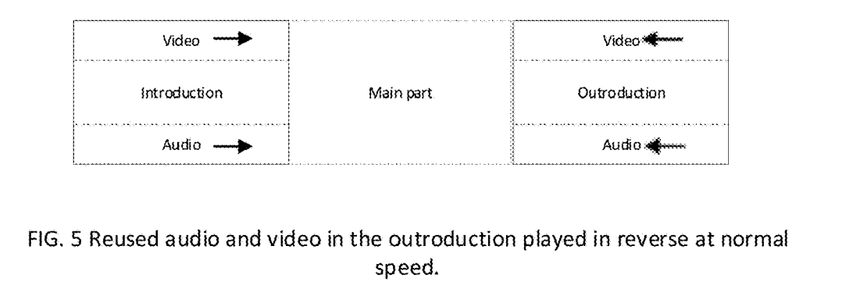
FIG. 5 is an embodiment of a video file with audio and video in the introduction reused for the outroduction wherein both the reused audio and video are played in reverse and at normal speed.

FIG. 5 is an embodiment of a video file with audio and video in the introduction reused for the outroduction wherein both the reused audio and video are played in reverse and at normal speed. This method may add fun to the viewers so that they could remember this video post more clearly.

Figure 6:
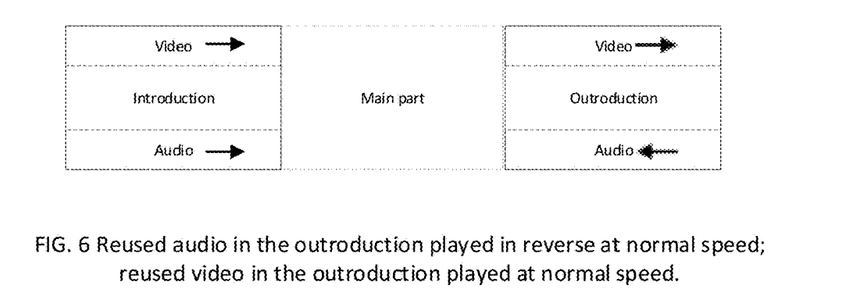
FIG. 6 is an embodiment of a video file with audio and video in the introduction reused for the outroduction wherein the reused audio is played in reverse and at normal speed and the reused video is played at normal speed.

FIG. 6 is an embodiment of a video file with audio and video in the introduction reused for the outroduction wherein the reused audio is played in reverse and at normal speed and the reused video is played at normal speed. This method may draw viewer's attention to the video part without too much attention to the details in the audio part.

Figure 7:
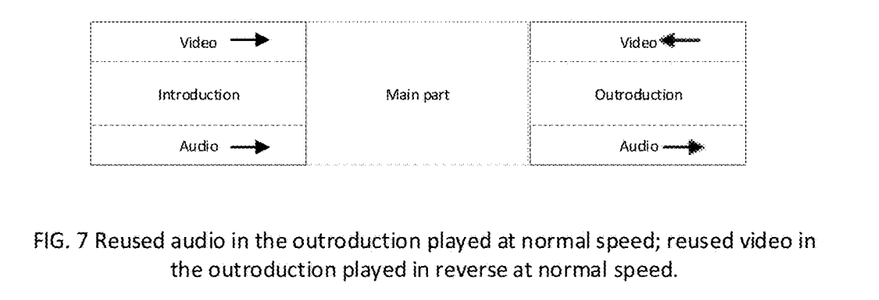
FIG. 7 is an embodiment of a video file with audio and video in the introduction reused for the outroduction wherein the reused video is played in reverse and at normal speed and the reused audio is played at normal speed.

FIG. 7 is an embodiment of a video file with audio and video in the introduction reused for the outroduction wherein the reused video is played in reverse and at normal speed and the reused audio is played at normal speed. This method may draw viewer's attention to the audio part without too much attention to the details in the video part.

The user may choose the methods in FIG. 4 to FIG. 7. The video editing program user interface in FIG. 1 can also provide explicit options to for the user through menu options or on-screen prompts. One example implementation of a pop-up prompt is reminding the user that the reused portion can be played at reverse and an independent choice can be made for the audio and video part separately. More examples are shown in FIG. 10 to FIG. 13.

In addition to the above operations on the reusing and forward versus reverse playing of the content, the speed of audio and video playing may be made faster or slower. The faster or slower speed can be paired with forward and reverse direction in a mutually independent manner. Each reused portion in FIG. 4 to FIG. 7, either audio or video could have the play speed altered. For example, both the audio and video reused in FIG. 4 can be played faster or slower; both the audio and video reused in FIG. 4 can be played faster or slower in reverse. Another example is the reused audio and video portions in FIG. 6 and FIG. 7 can be played at a different speed although the audio and video portion are played at opposite direction.

The user can make such choice about the play speed. The video editing program user interface in FIG. 1 can also provide explicit options to for the user through menu options or on-screen prompts. One example implementation of a pop-up prompt is reminding the user that the reused portion can be played at different speeds. More examples are shown in FIG. 10 to FIG. 13.

The audio play speed and the video play speed may be kept the same when both are played faster or slower than normal and may be played at opposite direction. The match between audio and video play speed may be manipulated if extra content can be added to the faster portion. For example, if the audio part is slower than video, some blank frames can be added to the video part, or some static or dynamic filler frames carrying certain information can be added; if the video part is slower than audio, a silence period, a white noise period, or some other audio content such music can be added to the audio part.

The user can make such choice about the match between audio and video play speed. The video editing program user interface in FIG. 1 can also provide explicit options to for the user through menu options or on-screen prompts. One example implementation of a pop-up prompt is reminding the user that the audio and video can be played at different speed between them and the mismatch need to be handled by adding content to the faster part. The video editing program user interface in FIG. 1 can also provide a list of possible new content. More examples are shown in FIG. 10 to FIG. 13.

Figure 8:
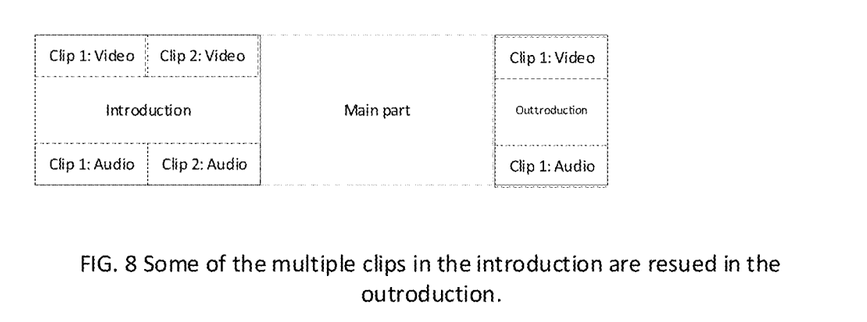
FIG. 8 is an embodiment of a video file with a subset of the multiple clips in the introduction reused for the outroduction.

The content in the introduction can be separated into sections or clips. Each section or clip can be referred to as a part of the content in the introduction. The reusing can be applied to any portion of the content in the introduction. The boundary of video clips can be provided by the video editing program user interface in FIG. 1 or arbitrarily determined by the user. The reusing can be applied to a subset of clips (user interface designated or user determined) from the introduction. FIG. 8 is an embodiment of a video file with a subset of the multiple clips in the introduction reused for the outroduction.

Figure 9:
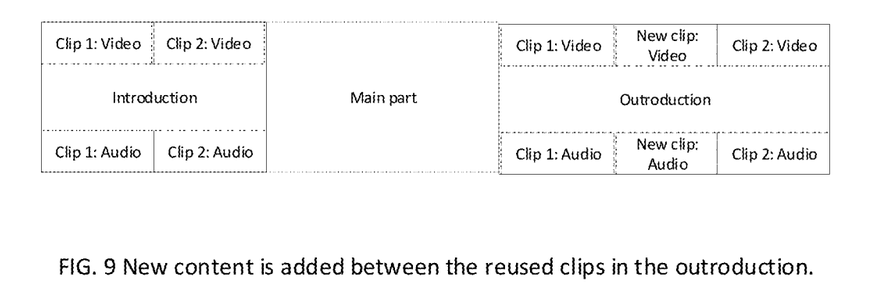
FIG. 9 is an embodiment of a video file with new content added between the multiple reused clips in the outroduction.

If multiple clips (user interface designated or user determined) from the introduction are reused in the outroduction, the clips reused may not be arranged in the same sequential order. New content can be inserted in between two reused clips. FIG. 9 shows an embodiment that new content is added to the middle of the two slips reused from the introduction in the outroduction. The order of the two clips can be flipped. Furthermore, the audio part of the reused clip 1 can be used accompanying the video part of the reused clip 2 in the outroduction and vice versa.

The playing speed and direction (normal or reverse) choices, as shown in example embodiments in FIG. 7 to FIG. 7 can be applied to each reused clip independently.

The user can make such choice about using some of the multiple clips and about the speed and direction of their playing in the outroduction. The video editing program user interface in FIG. 1 can also provide explicit options to for the user through menu options or on-screen prompts. More examples are shown in FIG. 10 to FIG. 13.

The selection of reused portion is not limited to portions in the introduction. The user can choose and the video editing program user interface in FIG. 1 can provide options or on-screen prompts to help the user to choose a portion of the main part of the video file to be reused for the outroduction. The mechanisms shown in FIG. 2 to FIG. 3 can all apply with the introduction part of the video file being replaced by the main part of the video file. All the other mechanisms about playing direction, speed, techniques about multiple clips including manipulating the order of playing and adding content can be applied in a similar manner.

In various discussion above, mechanisms for displaying menus and prompts by the video editing program user interface are described in detail below.

Figure 10:
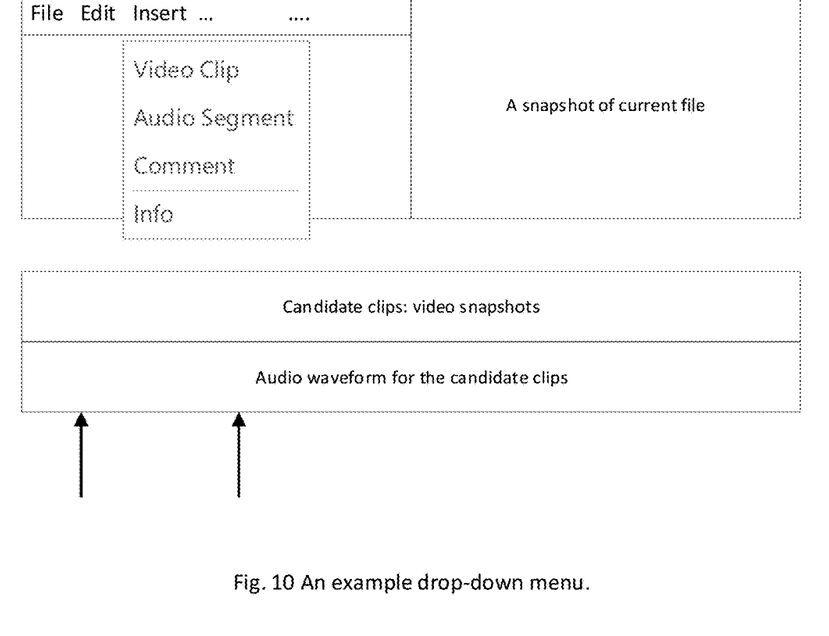
FIG. 10 is a default drop down menu for the video editing program user interface.

FIG. 10 is a default drop down menu for the video editing program user interface. The editing of a video file may be called a "Project" by the video editing application program. This is a common interface which is similar to many editors. Here the drop-down option menu for "Insert" includes "Video Clip", "Audio Segment", "Comment" and "Info" for the user to add a video clip, an audio segment, comment to the scene or information about the scene.

Figure 11:
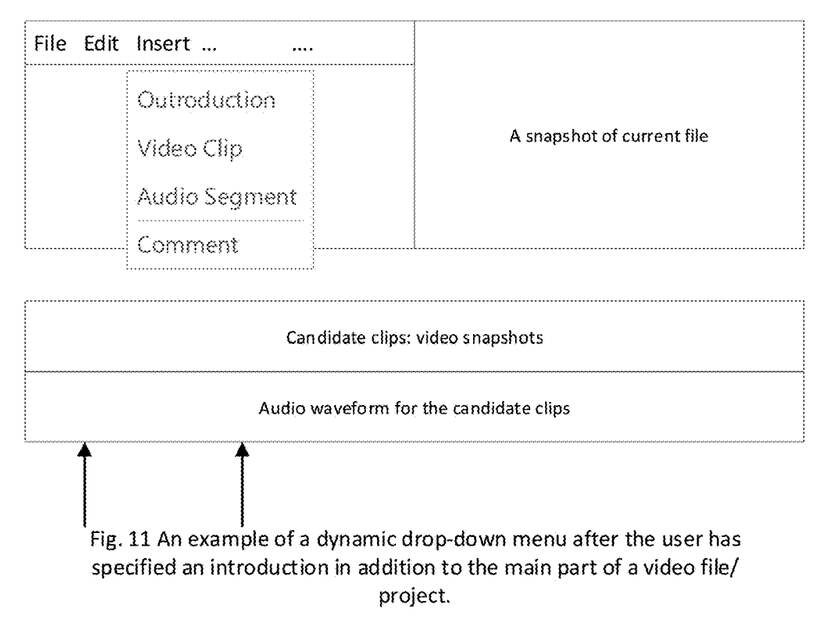
FIG. 11 is an example of a dynamic drop-down menu after the user has specified an introduction in addition to the main part of a video file/project.

When the user specifies an introduction in addition to the main part of a video file/project, the default menu in FIG. 10 is adapted. FIG. 11 is an example of such an adaptation which produces a dynamic drop-down menu. Here the drop-down option menu for "Insert" has "Outroduction" added to the list. It is easier for a user to add and edit the outroduction by clicking this option. More options associated with outroduction will be presented to the user, including selecting part of introduction or main part, playing the introduction in reverse, playing speed, etc. Such additional options can be seen in a similar way as the mechanism discussed in FIG. 12.

Figure 12:
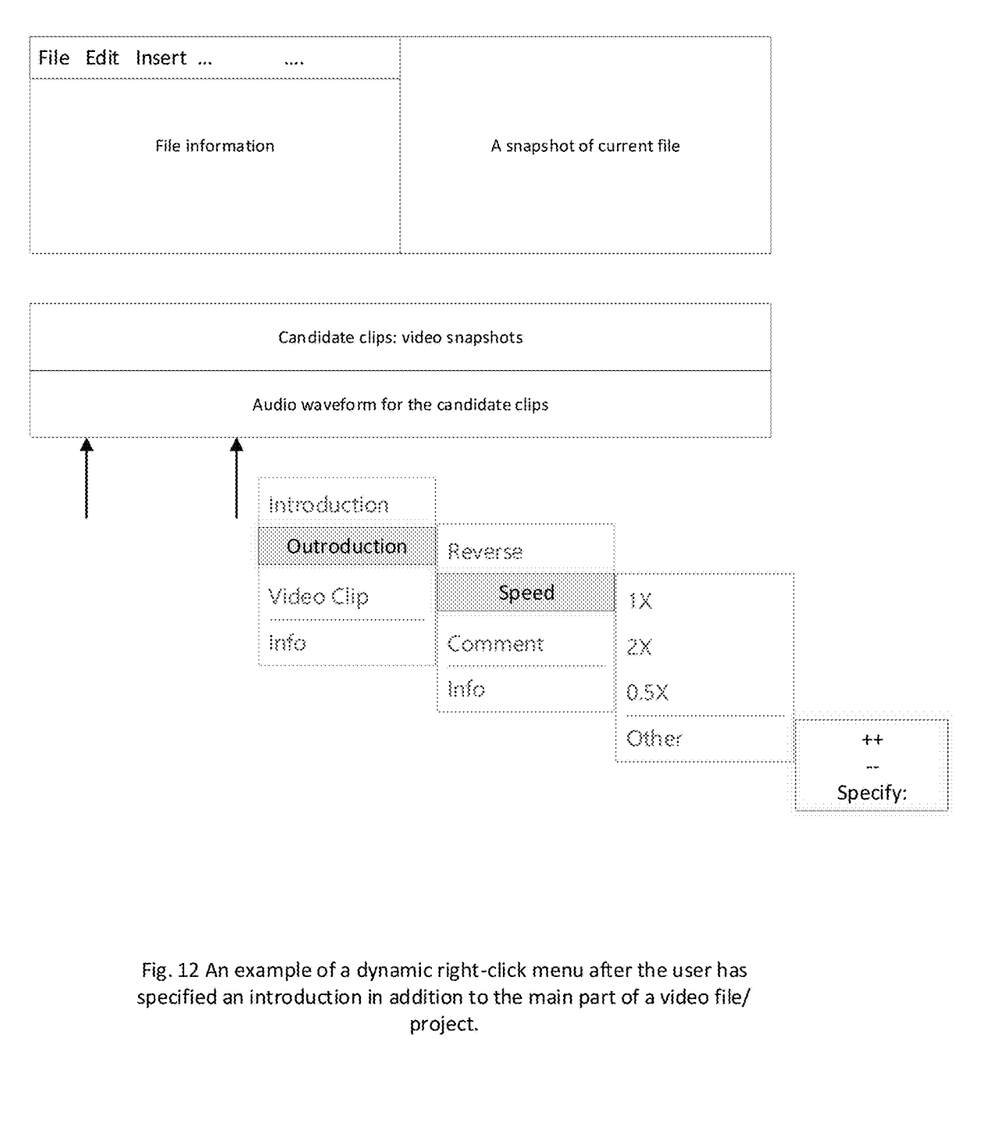
FIG. 12 is an example of a dynamic right-click menu after the user has specified an introduction in addition to the main part of a video file/project.

FIG. 12 is an example of a dynamic right-click menu after the user has specified an introduction in addition to the main part of a video file/project. This menu is shown to the user with a right click. Here the first layer of option menu has "Outroduction". It is easier for a user to add and edit the outroduction by clicking this option. More options associated with outroduction will be presented to the user. For example, the second layer associated with outroduction has options of "Reverse" (for playing the selected material in reverse), "Speed" (playing speed), "Comment" (for adding comments) and "Info" (for adding information), etc. The third layer option menu associated with "Speed" has a list of default speeds such as "1×", "2×", "0.5×" and "Other" which allows the user to "++" (increase) or "--" (decrease) or simply specify a value. Note the playing speed is coupled with the "Reverse" option.

Figure 13:
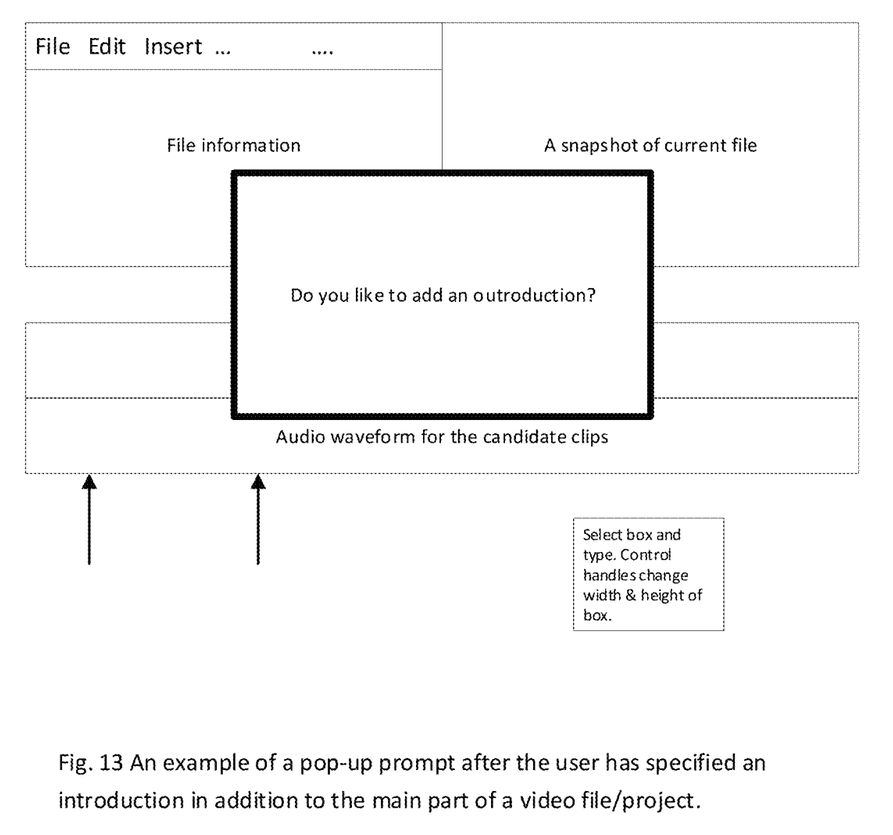
FIG. 13 is an example of a pop-up prompt after the user has specified an introduction in addition to the main part of a video file/project.

FIG. 13 is an example of a pop-up prompt after the user has specified an introduction in addition to the main part of a video file/project. This is an alternative or addition mechanism to prompt the user to add an outroduction.

Figure 14:
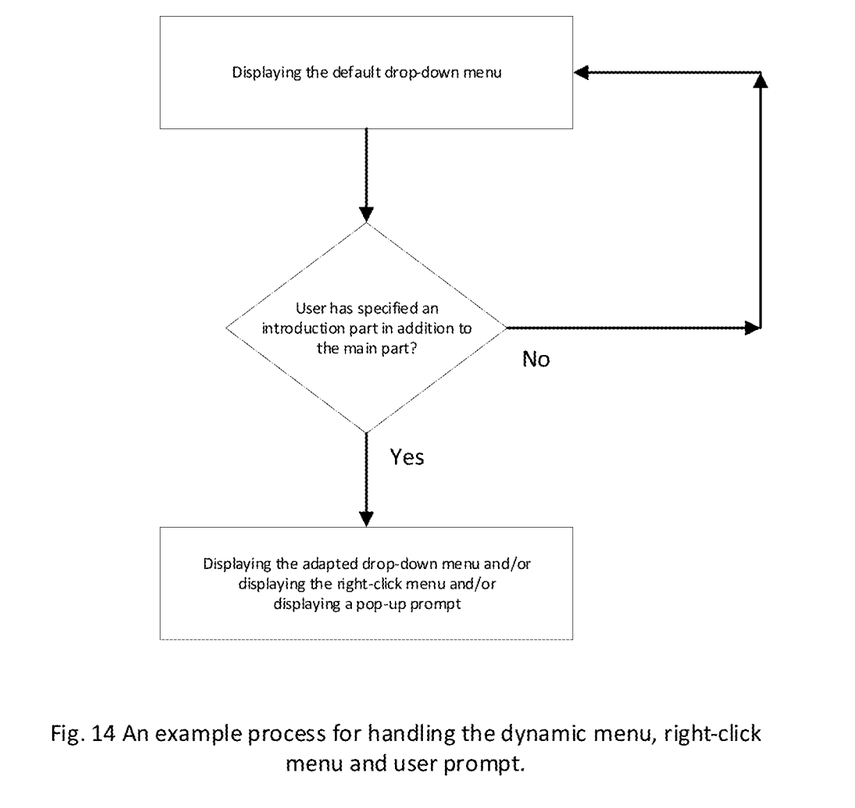
FIG. 14 is an example process for handling the dynamic menu, right-click menu and user prompt.

FIG. 14 is an example process for handling the dynamic menu, right-click menu and user prompt. The default menu is used in the beginning. If a user has added an introduction to the video, the dynamic operations will starting, including but not limited to, displaying the adapted drop-down menu and/or displaying the right-click menu and/or displaying a pop-up prompt.

The methods and apparatus described above can be used to generate or provide options to generate the outroduction based on reusing some of the content from the main parts, including reusing multiple clips, with new content optionally added in between, playing some of the clips in the clip in the reverse order and some at different speeds.

The mechanism can be carried out by content generators, for example, the users who make and upload audio or video files. The mechanism can also be carried out by an audio or video editing software which offers an option for the user to generate an outroduction based on the above choices. For example, a video editing program user interface with options may pop up when the user click on "outroduction". The video editing program user interface may ask the user whether he/she would like to use the some of introduction material and whether some of the media will be played in reverse order and/or at different speeds. The reverse speed could be marked by negative numbers: 1× for normal forward mode, −1× for normal speed reverse mode, +0.5× for half speed forward, etc.

The input from the user may be collected by the computer through finger touch on a touchable screen, or mouse clicks on a computer screen.

The program may reside in the memory or hard drive of the device it is executed.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

It should be understood that the disclosed method and apparatus may be applied to a variety of computing devices, including portable and desktop computers, mainframe computers, personal digital assistants (PDAs), to name a few. In general, the disclosed method and apparatus may be applied to any electronic device requiring software to perform an intended task.

The invention claimed is:

1. A multimedia editing method for editing an audio or video file, the file includes one or a plurality of audio or video clips forming at least an introduction part and a main part, the method comprising the steps of
providing a prompt for an outroduction part (outroduction) after the main part, providing a pop-up prompt reminding a user that a part of the introduction can be reused for the outroduction,
providing menu options for reusing at least a part of the introduction part for the outroduction, including a menu option for reusing at least part of audio and/or video content in the introduction part for the outroduction part, playing the part of the audio and/or video content from the reused introduction part in the outroduction part in reverse order and playing the audio content from the reused introduction part in the outroduction part at a different speed than playing the video content from the reused introduction part in the outroduction part,
wherein the menu option includes a dynamic right-click menu whose first layer of option menu has "Outroduction", and the second layer option menu associated with "Outroduction" has options of "Reverse", "Speed" and one or more options of "Comment" and "Info", and the third layer option menu associated with "Speed" has a list of default speeds and "Other" which allows the user to increase or decrease the speed or simply specify a speed value, wherein the speed is coupled with the "Reverse" option.

2. The multimedia editing method according to claim 1 further comprising providing menu options to play a plurality of reused clips from one or both of the audio and/or video parts from the introduction part in the outroduction part in either forward or reverse order and at the same or different speeds.

3. The multimedia editing method according to claim 1 further comprising providing menu options to insert new content between two of the audio and/or video parts reused from the introduction.

4. The multimedia editing method according to claim 3 further comprises using some or all of the content generated by GPU rendering.

5. An apparatus in a computing device comprising a screen configured to
display a multimedia user interface (UI) showing an audio and/or video content and providing menu options for editing, wherein the audio and/or video content includes at least an introduction part and main part,
receive commands from a user,
display a prompt for an outroduction after the main part,
display a pop-up prompt reminding a user that a part of the introduction can be reused for the outroduction, and
display menu options for reusing at least a part of the introduction part for the outroduction, including a menu option for reusing at least part of audio and/or video content in the introduction part for the outroduction, playing the part of the audio and/or video content from the reused introduction part in the outroduction in reverse order and playing the audio content from the reused introduction part in the outroduction part at a different speed than playing the video content from the reused introduction part in the outroduction part,
wherein the menu options include a dynamic right-click menu whose first layer of option menu has "Outroduction", and the second layer option menu associated with "Outroduction" has options of "Reverse", "Speed" and one or more options of "Comment" and "Info", and the third layer option menu associated with "Speed" has a list of default speeds and "Other" which allows the user to increase or decrease the speed or simply specify a speed value, wherein the speed is coupled with the "Reverse" option.

6. The apparatus according to claim 5 further configured to display menu options to play a plurality of reused clips from one or both of the audio and/or video parts from the introduction part in the outroduction part in either forward or reverse order and at the same or different speeds.

7. The apparatus according to claim 6 further configured to display menu options to insert new content between two of the audio and/or video parts reused from the introduction.

8. The apparatus according to claim 5 further comprises using some or all of the content generated by GPU rendering.

9. A multimedia file production method for producing an audio or video file, the file includes one or a plurality of audio or video clips forming at least an introduction part and a main part, the method comprising the steps of
adding an outroduction part (outroduction) after the main part based on a prompt, reusing at least a part of the introduction part for the outroduction based on menu options including a pop-up prompt reminding a user that a part of the introduction can be reused for the outroduction,
wherein the reusing comprises, based on one of the menu options, using at least part of audio and/or video content in the introduction part for the outroduction part, playing the part of the audio and/or video content from the reused introduction part in the outroduction part in reverse order and playing the audio content from the reused introduction part in the outroduction part at a different speed than playing the video content from the reused introduction part in the outroduction part, wherein the menu options include a dynamic right-click menu whose first layer of option menu has "Outroduction", and the second layer option menu associated with "Outroduction" has options of "Reverse", "Speed" and one or more options of "Comment" and "Info", and the third layer option menu associated with "Speed" has a list of default speeds and "Other" which allows the user to increase or decrease the speed or simply specify a speed value, wherein the speed is coupled with the "Reverse" option.

10. The multimedia file production method according to claim 9 further comprising a plurality of clips from the reused one or both of audio and/or video parts from the introduction part are played in the outroduction part in either forward or reverse order and at the same or different speeds.

11. The multimedia file production method according to claim 10 further comprising inserting new content between two of the audio and/or video parts reused from the introduction.

12. The multimedia file production method according to claim 9 further using some or all of the content generated by GPU rendering.

* * * * *